United States Patent [19]

Harrison et al.

[11] Patent Number: 4,517,846
[45] Date of Patent: May 21, 1985

[54] ELECTROMAGNETIC FLOWMETER

[75] Inventors: Derek N. Harrison; Trevor C. Purling, both of Gloucestershire, United Kingdom

[73] Assignee: Flowmetering Instruments Limited, Gloucestershire, England

[21] Appl. No.: 503,583

[22] Filed: Jun. 13, 1983

[51] Int. Cl.³ .............................................. G01F 1/58
[52] U.S. Cl. ................................................. 73/861.12
[58] Field of Search ........................ 73/861.12–861.17

[56] References Cited

U.S. PATENT DOCUMENTS

| 3,177,709 | 4/1965 | Fischer | 73/861.16 |
| 3,397,331 | 8/1968 | Burkhard | 310/11 |
| 3,786,680 | 1/1974 | Wyatt et al. | 73/861.12 |
| 4,268,765 | 5/1981 | Hoover, Jr. | 310/11 |
| 4,296,636 | 10/1981 | Mannherz | 73/861.12 |

Primary Examiner—Charles A. Ruehl
Attorney, Agent, or Firm—Young & Thompson

[57] ABSTRACT

An electromagnetic flowmeter has a flow tube for conducting the fluid or slurry whose flow rate is to be measured, magnetic field coils which are excited by low frequency pulses in use, and two electrodes for detecting the e.m.f. induced across the flowing fluid or slurry by the magnetic field associated with the coils. In order to substantially reduce the noise component of the flow-induced signal, the electrodes are coated with a porous electrically insulating material such as alumina. A considerable improvement in measurement accuracy is thereby obtained.

9 Claims, 2 Drawing Figures

ELECTROMAGNETIC FLOWMETER

BACKGROUND OF THE INVENTION

This invention relates to electromagnetic flowmeters for monitoring the rate of flow of an electrically conductive fluid or slurry and is more particularly, but not exclusively, concerned with such flowmeters utilising a system of excitation in which the field coils are periodically pulsed at low frequency.

In an electromagnetic flowmeter the fluid or slurry whose flow rate is to be measured is conducted along a flow tube within which a magnetic field is established by an electromagnet transversely to the axis of the tube. By Faraday's law of electromagnetic induction, an e.m.f. is thereby induced across the flowing fluid or slurry transversely to the magnetic field, the magnitude of the e.m.f. being proportional to the rate of flow of the fluid or slurry. This e.m.f. is detected by appropriately positioned measuring electrodes, and the signal thus detected is amplified and converted into direct current form before being supplied to an indicator or recorder.

Until recently most electromagnetic flowmeters utilised a.c. excitation of the field coils. This avoids the problem of polarization of the electrodes obtained when d.c. excitation is used. However, the use of a.c. excitation has distinct drawbacks in that various interference voltages unrelated to flow rate are induced in the measuring electrodes. This has led to flowmeters being proposed in which the field coils are excited by low frequency d.c. pulses. However, more particularly where the flowmeter is being used to measure the flow rate of a slurry, it has been found that the noise component due to disturbances at the electrode/slurry interface lies within the same frequency range as the flow-induced measurement signal, and this may severely limit the accuracy of measurement. It has been proposed in U.S. Pat. No. 4,296,636 to minimize the noise component by forming the electrodes from an extremely hard metal or metal alloy. However, the results obtained with such electrodes have been found to be unsatisfactory.

It is an object of the invention to provide an electromagnetic flowmeter which exhibits high measurement accuracy even when it is used to measure the flow rate of a slurry.

SUMMARY OF THE INVENTION

According to the invention there is provided an electromagnetic flowmeter comprising a flow tube for conducting the fluid or slurry whose flow rate is to be monitored, magnetic field generating means for producing a magnetic field within the flow tube transverse to the axis of the tube, and a pair of electrodes mounted on opposite sides of the tube for detecting the resultant e.m.f. induced across the flowing fluid or slurry transversely to the magnetic field and for thereby providing an output signal proportional to the flow rate of the fluid or slurry, wherein at least one of the electrodes is coated with a porous electrically insulating material to decrease the level of the noise component of the output signal.

In a preferred form of the invention the magnetic field generating means includes at least one magnetic field coil and excitation means for exciting the coil with pulses at a low repetition frequency, typically 2.5 to 12 Hz.

Tests have shown that the conditions existing at the electrode/fluid interfaces in operation of an electromagnetic flowmeter utilizing conventional metal electrodes are highly complex. More particularly the contact between the electrodes and the fluid includes both resistive and capacitative components and this, combined with the high input impedance required for the detection circuitry, has the effect of requiring a relatively long period of time for stabilization of the electrode/fluid interfaces after physical or chemical disturbance. These effects are particularly significant where the field coils are excited with low frequency pulses. Stabilization times are dependent on the material used for the electrodes and the fluid or slurry whose flow rate is to be measured. Furthermore the two electrode/fluid interfaces may stabilize at different rates. Galvanic potentials are also produced at the electrodes which will vary with time depending entirely on the condition of the interfaces. Normally the galvanic potentials will not affect the accuracy of the flowmeter. However, unstable or disturbed interfaces can cause severe errors in measurement of the flow rate. Often these errors appear as spikes or jumps in the flow record. The interface disturbances may be caused chemically by a change in the nature of the flowing liquid, i.e. pH, temperature, etc., or physically by mechanical abrasion of the interface by suspended particles.

A very significant improvement in measurement accuracy is obtainable by use of the flowmeter of the invention, more particularly when measuring the flow rate of a slurry. This is believed to be due at least in part to the fact that the interface between the electrically conductive part of each electrode and the fluid or slurry is shielded by the coating of electrically insulating material from the effects of physical disturbances in the vicinity of the electrode, such as the impact of solid particles on the electrode, whilst the porosity of the coating ensures that electrical contact is maintained between the electrode and the fluid or slurry whose flow rate is to be measured. Also the apparent surface area of each electrode may be increased due to the "shot blasting" effect of the coating process, and this may assist in rapid stabilization of the electrode/fluid interface.

The coating material may be a refractory material, and is preferably a porous ceramic material such as alumina which has a high dielectric constant. The thickness of the coating may be in the range from 0.1 mm to 1.0 mm, and is preferably in the range from 0.25 mm to 0.5 mm. The remainder of the electrode may be made of any electrically conducting material which is compatible with the fluid or slurry whose flow rate is to be measured. This material may be stainless steel, "Hastelloy"-brand chromium-nickel alloy or a platinum-iridium alloy, for example. Furthermore each electrode may have a substantially domed head which comes into contact with the fluid or slurry in use. However, the materials chosen for the electrodes, and the type of electrode selected, will depend on the particular application.

Each electrode is conveniently coated with the porous electrically insulating material only on that part of the electrode which comes into contact with the fluid or slurry in use.

The invention also provides an electrode for an electromagnetic flowmeter comprising a flow tube for conducting the fluid or slurry whose flow rate is to be monitored, and magnetic field generating means, the electrode being coated with a porous electrically insulating material and being provided with means for attaching the electrode to the inside wall of the flow tube.

BRIEF DESCRIPTION OF THE DRAWINGS

In order that the invention may be more fully understood, a preferred embodiment of the invention will now be described, by way of example, with reference to the accompanying drawings, in which.

DETAILED DESCRIPTION OF THE DRAWINGS

Figure 1:
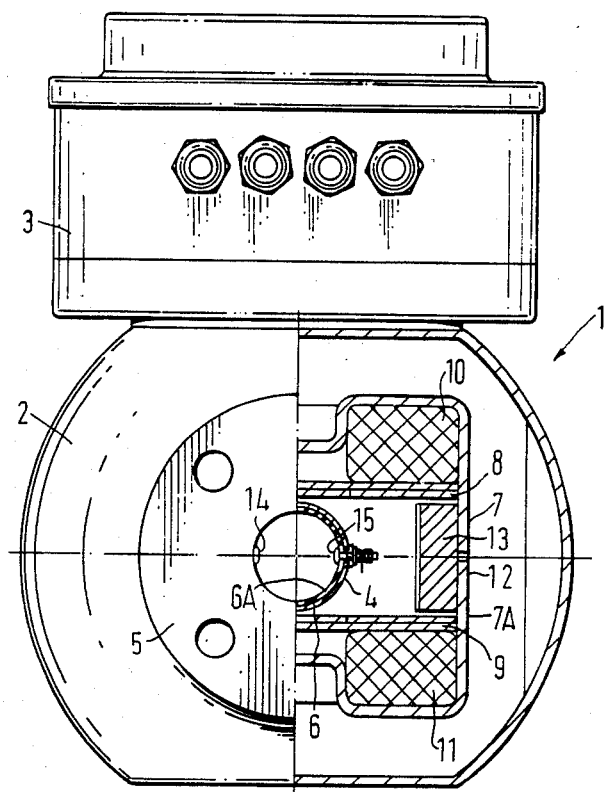
FIG. 1 is an end view of the flowmeter with the casing cut away to show a part of the assembly in cross-section in the vicinity of the electrodes.

The illustrated flowmeter is designed to measure the flow rate of an electrically conducting slurry along a pipe run, and comprises an outer casing 2 and a converter unit 3 integral therewith. Within the casing 2 is a tube 4 formed with a circular flange 5 at each end externally of the casing 2 for connection to a respective pipe section within the pipe run in which the flow rate is to be measured, the tube 4 being of the same internal cross-section as the pipe run. The tube 4 comprises a stainless steel outer sleeve 6 and a rubber inner lining 6A. Furthermore the tube 4 supports a magnet assembly 12 comprising two coil mounting platforms 8 and 9 arranged respectively above and below the sleeve 6 and attached to the tube 4 by support struts (not shown), two rectangular field coils 10 and 11 mounted on the platforms 8 and 9, two core members 7 and 7A enveloping the coils 10 and 11 in the vicinity of the electrodes and two core mounting battens 13 arranged on either side of the tube 14 and attached at their ends to the support struts.

Figure 2:
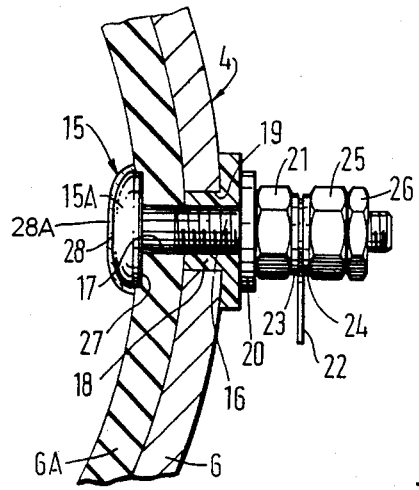
FIG. 2 is an enlarged detail showing a cross-section in the vicinity of one of the electrodes.

Two stainless steel electrodes 14 and 15 are mounted directly opposite one another on the inside wall of the tube 4 at equal distances from the two ends of the tube 4. As will be appreciated by referring to the enlarged detail of FIG. 2 in which the electrode 15 is shown by way of example, the electrode incorporates a domed head 15A having a diameter of about 9 mm, and a screwthreaded shaft 16 which extends through an aperture 17 in the inner lining 6A and an electrode bush 18 fitted within an aligned aperture 19 in the wall of the sleeve 6. Furthermore the electrode is fixed in position by means of a flat washer 20 and a nut 21 screwed on the shaft 16, and a solder tag 22 is connected to the shaft 16 between two flat washers 23 and 24 by two further nuts 25 and 26. Leads (not shown) are connected between the solder tags 22 associated with the electrodes 14 and 15 and the converter unit 3. The head 15A is provided with an annular cutting edge 27 which cuts into the rubber lining 6A to provide a reliable seal between the head 15A and the lining 6A.

The inner surface 28 of the head 15A of each electrode, which comes into contact with the slurry flowing within the tube 4 in use, is coated with an electrically insulating refractory material 28A which is porous to the liquid component of the slurry so as to maintain electrical contact between the slurry and the electrically conductive part of the electrode. The coating material is preferably superfine white alumina (aluminium oxide) of the type sold under the trade name METCO 105SF by METCO Inc. and is applied by a plasma flame spray process. Such a coating has a high dielectric constant and is resistant to abrasion and particle erosion. The coating has a thickness of 0.25 to 0.5 mm, and the inner surface 28 has a generally domed shape but with its innermost portion substantially flattened.

In use of this flowmeter to measure the flow rate of a slurry flowing along the tube 4, the field coils are supplied with 24 V d.c. pulses having a substantially square waveform at a repetition frequency of approximately 2.6 Hz, the polarity of the supply being reversed every cycle. This causes a uniform pulsating magnetic field to be established between the electrodes 14 and 15 in a direction normal to both the measurement axis of the electrodes and the axis of the tube 4. The resultant pulsating e.m.f. proportional to the flow rate which is developed across the slurry flowing in the tube 4 is detected by the electrodes 14 and 15, and the output signal from the electrodes is amplified and fed to an analogue to digital converter which samples the signal at five points during each measuring cycle and supplies an averaged measurement signal to a suitable indicator or recorder.

The alumina coating on the inner surface 28 of each electrode serves to shield the electrically conductive part of the electrode from the effect of solid particles within the slurry impacting on the electrode, and thus dramatically decreases the noise level of the flow induced signal. A considerable improvement in the measurement accuracy is thereby obtained.

We claim:

1. An electromagnetic flowmeter comprising a flow tube for conducting the fluid or slurry whose flow rate is to be monitored, magnetic field generating means for producing a magnetic field within the flow tube transverse to the axis of the tube, and a pair of electrodes mounted on opposite sides of the tube for detecting the resultant e.m.f. induced across the flowing fluid or slurry transversely to the magnetic field and for thereby providing an output signal proportional to the flow rate of the fluid or slurry, wherein at least one of the electrodes is coated with a porous electrically insulating material to decrease the level of noise component of the output signal.

2. An electromagnetic flowmeter according to claim 1, wherein the magnetic field generating means includes at least one magnetic field coil and excitation means for exciting the coil with pulses at a low repetition frequency.

3. An electromagnetic flowmeter according to claim 1, wherein the coating material of the or each electrode is a refractory material.

4. An electromagnetic flowmeter according to claim 3, wherein the coating material of the or each electrode is alumina.

5. An electromagnetic flowmeter according to claim 1, wherein the thickness of the coating material of the or each electrode is in the range from 0.25 mm to 0.5 mm.

6. An electromagnetic flowmeter according to claim 1, wherein said one or each electrode is coated with the porous electrically insulating material only on that part of the electrode which comes into contact with the fluid or slurry in use.

7. An electromagnetic flowmeter according to claim 1, wherein said one or each electrode comprises a head which comes into contact with the fluid or slurry in use, and a screwthreaded shaft for attaching the electrode to the wall of the flow tube.

8. An electromagnetic flowmeter according to claim 7, wherein the head is of substantially domed shape.

9. An electromagnetic flowmeter according to claim 7, wherein the head has an annular cutting edge which cuts into the inside wall of the flow tube.

* * * * *